United States Patent Office 3,265,616
Patented August 9, 1966

3,265,616
METHOD OF CLEANING OR COLLECTING OIL FROM THE SURFACE OF AN AREA OF WATER
Kenneth Ian Wyllie, Lymington, and Edward William Duck, Hythe, England, assignors to The International Synthetic Rubber Company Limited, Southampton, England, a corporation of United Kingdom
No Drawing. Filed Dec. 20, 1963, Ser. No. 332,280
Claims priority, application Great Britain, Dec. 31, 1962, 49,076/62
12 Claims. (Cl. 210—39)

The present invention relates to a method of cleaning or collecting oil from the surface of an area of water.

Areas of the sea and also inland waters may become polluted from time to time by the spillage or discharge of oil which usually forms a surface layer possibly extending over a wide area. Where this occurs it may cause irreparable damage to a beach and to wild life, particularly if the oil in question is a black, sticky bunker oil.

The present invention seeks to provide a method for limiting the spread of, and for cleaning up such a contaminated area. This has hitherto never been successfully accomplished. Attempts at spraying such an oil layer with a surface active agent are very expensive in order to obtain a reasonable dispersion of the oil. It is not an efficient method however since the satisfactory emulsification of an oil in water requires vigorous agitation and this is not always possible.

Synthetic rubbers can be prepared in the latex form and the latex can be mixed with considerable quantities of oil before coagulation, when the oil is incorporated in the rubber. We have now found that this property of a synthetic rubber latex can be put to use for absorbing and removing oil patches on water and is particularly effective on sea-water, which contains salt.

According to the present invention a method of cleaning or collecting a surface layer of oil from an area of water comprises applying a synthetic rubber latex to the oil, coagulating the latex plus absorbed oil in the presence of an aqueous salt solution or an aqueous acid solution to produce oil containing rubber film, crumbs or particles and then skimming said crumbs or particles from the water surface.

According to one embodiment of the present invention an oil patch is sprayed with a rubber latex which preferentially contains between 5% and 25% of rubber though higher and lower contents are not excluded. On contact with the oil layer the rubber in the latex, helped to a certain extent by emulsifiers present, absorbs the oil. The emulsifiers present are those required for latex manufacture. The most satisfactory are fatty acid soaps. Rosin acid soaps are often used. Latices can also be prepared with cationic emulsifiers but are not often produced. In the presence of salt water the latex plus absorbed oil coagulates to produce lumps or crumbs. The coagulation process can be enhanced by a subsequent spraying with a diluted aqueous solution of acidic brine. Alternatively an acidic solution containing no salt may be used. The acid solution, if used alone, should have a pH of less than 6.5. For fresh water it is essential that either the salt solution or the acidic solution should be added since soluble salts are not otherwise present in sufficient quantity to cause coagulation. The salt solution should have a concentration of at least 1–2% if coagulation is to be efficient.

After that treatment the oil-containing rubber may be gathered up by means of a net or a wire gauze. In cold areas a half inch mesh is quite sufficient to entrap the oil-containing rubber but in warmer areas a finer mesh may be advantageous in order to help trap any oil that escapes the rubber. The net or gauze may be used in any convenient manner. For example the coagulated rubber mass can be pushed using a vertical gauze or it may be dragged using a net or gauze. This process may well be easier if the coagulated rubber is allowed to harden for a period, for example one day, before removing it.

Though in principle any non-oil-resisting rubber latex could be used in this fashion a cheap, readily available latex is that of a styrene-butadiene copolymer known as styrene-butadiene rubber (S.B.R.) prepared synthetically in an aqueous emulsion. Other suitable rubbers are polybutadiene and butyl rubber. Such a latex can be prepared to practically any degree of coagulation stability depending upon the emulsifiers, electrolytes, buffers and polymer it contains. When a styrene-butadiene rubber is used styrene contents between 0% and 50% are preferable and the molecular weight of the polymer is preferably but not exclusively within the range 20,000 to 400,000 based on an intrinsic viscosity measurement in toluene at 25° C. and calculated according to the formula:

$$\text{Intrinsic viscosity } (I.V.) = K\overline{M}_v{}^\alpha$$

where $K = 1.65 \times 10^{-4}$ and
$\alpha = 0.78$

The dry rubber used should generally amount to ¼ the weight of oil. Thus if a latex at 50% solids is used, the weight of the latex should be about half that of the oil spilt.

Suitably the latex may be sprayed from a knapsack sprayer. It is necessary that the nozzle should be such as to produce a jet or spray with a long trajectory although distribution of the latex within the jet need not be critical. In wind the usual precautions should be taken to ensure accurate spraying, e.g. keeping the gun upwind, to ensure that the latex is directed into the best area.

Example 1

An S.B.R. latex containing about 20% of a styrene-butadiene rubber copolymer of 23% bound styrene and I.V. of 1.9, and rosin emulsifier was sprayed first around the periphery and then over a surface patch of lubricating oil on sea-water in a large tank. The oil patch was several square feet in diameter. The sea-water was subjected to some flow and agitation but not such that the oil layer broke up. As the oil became absorbed in the rubber the patch contracted in size until finally only discrete lumps and crumbs of rubber were left as the rubber coagulated. Only a trace of oil remained on the surface after removal of the rubber particles.

The spraying of the latex around the periphery effectively prevented the oil patch from spreading.

Example 2

Procedure substantially as in Example 1 but the oil in question was a dark, heavy bunker oil. The latex was sprayed around the periphery and a period of several minutes allowed to elapse before the rest of the surface was sprayed. In this way it was seen how effectively the spread of the oil patch was limited. The same overall result as in Example 1 was obtained.

What is claimed is:
1. A process for providing clean water by collecting surface oil therefrom comprising applying a synthetic non-oil resisting rubber latex to the surface having oil thereon and absorbing oil in said latex, coagulating said latex together with sorbed oil in the presence of a solution selected from the group consisting of aqueous salt solutions and aqueous acid solutions to form rubber con- taining oil, and removing said rubber containing oil from the water surface.

2. A process as claimed in claim 1 in which said synthetic rubber latex is one of styrene-butadiene rubber.

3. A process as claimed in claim 1 in which said synthetic rubber latex contains between 5% and 25% of said rubber.

4. A process as claimed in claim 1 in which at least one emulsifier is present in said synthetic rubber latex.

5. A process as claimed in claim 1 in which at least part of said salt is provided by application of acidic brine subsequent to said application of said synthetic rubber latex.

6. A process for providing clean water by collecting surface oil therefrom comprising spraying over the surface a synthetic non-oil-resisting rubber latex and absorbing surface oil in said latex, coagulating said latex together with sorbed oil in the presence of a solution selected from the group consisting of aqueous salt solutions and aqueous acid solutions to form crumbs of rubber with oil, and removing said crumbs from the water surface.

7. A process as claimed in claim 6 in which said synthetic rubber latex is one of styrene-butadiene rubber.

8. A process as claimed in claim 6 in which said synthetic rubber latex contains between 5% and 25% of said rubber.

9. A process as claimed in claim 6 in which said water is sea water.

10. A process as claimed in claim 6 in which at least one emulsifier is present in said synthetic rubber latex.

11. A process as claimed in claim 6 in which at least part of said salt is provided by spraying with acidic brine subsequent to said spraying with said synthetic rubber latex.

12. A process as claimed in claim 6 in which said rubber crumbs are removed from said surface by skimming them off.

References Cited by the Examiner

UNITED STATES PATENTS 3,131,160  4/1964  Alexander et al. _____ 210—54 X
3,198,731  8/1965  De Lew _____ 210—42

FOREIGN PATENTS 323,094  12/1929  Great Britain.

MORRIS O. WOLK, *Primary Examiner.*

M. E. ROGERS, *Assistant Examiner.*